Feb. 15, 1927.
F. E. WOLCOTT
1,617,558
ELECTRIC TOASTER
Filed Nov. 16, 1925
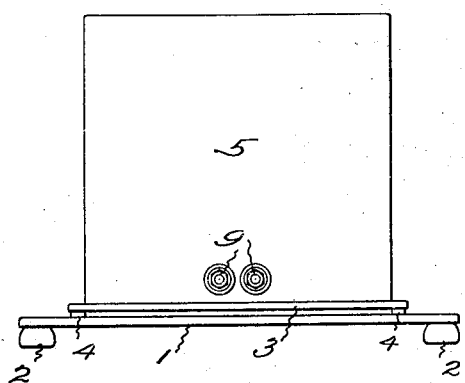
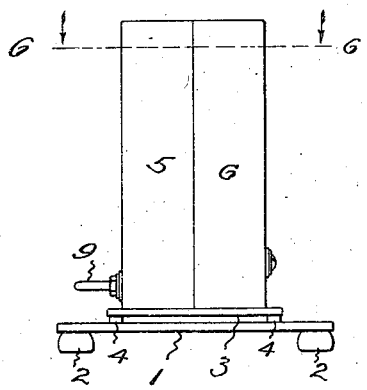
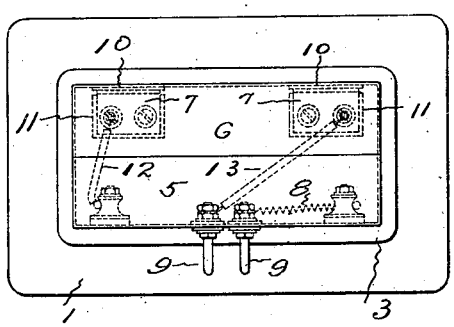
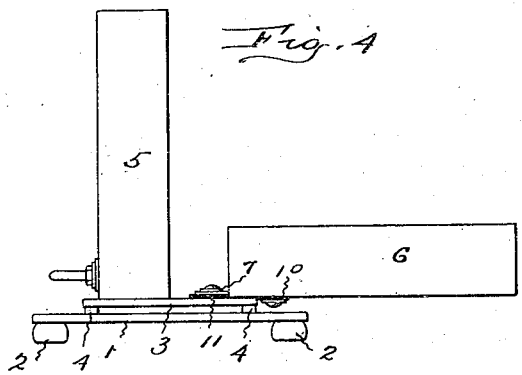
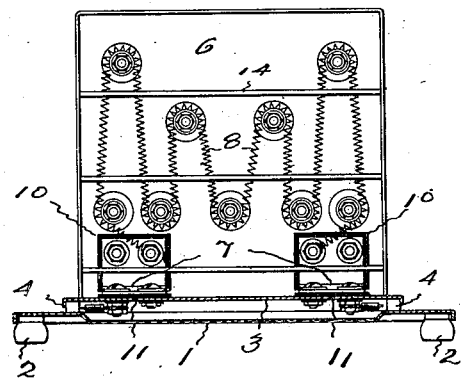
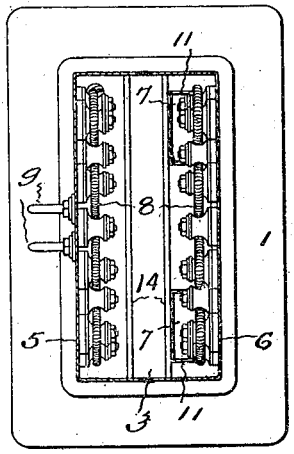
INVENTOR
Frank E. Wolcott
Harry P. Williams
atty.

Patented Feb. 15, 1927.

1,617,558

UNITED STATES PATENT OFFICE.

FRANK E. WOLCOTT, OF WEST HARTFORD, CONNECTICUT, ASSIGNOR TO THE FRANK E. WOLCOTT MANUFACTURING COMPANY, OF HARTFORD, CONNECTICUT, A CORPORATION OF CONNECTICUT.

ELECTRIC TOASTER.

Application filed November 16, 1925. Serial No. 69,343.

This invention relates to those electric toasters which are known as the oven type, that is, such as have a heating element arranged on each side of the space into which the matter to be toasted is placed, each element and the intermediate toast space being surrounded and enclosed by a casing that conserves the heat and concentrates it against both sides of the substance being toasted.

The object of the present invention is to provide a toaster of this character which has the casing and heating elements so mounted that it is a simple matter to arrange the piece for toasting and removing it after it has been toasted.

This object is attained in the embodiment of the invention illustrated by mounting one heating element in a box or case section that has its inner side open and is arranged to stand vertically on a base, and mounting another heating element in a similar box or case section that is hinged to the base so that it may be swung vertically against the open side of the fixed section while toasting, or may be turned to a horizontal position to permit matter to be placed thereon before toasting or removed therefrom after toasting, the hinges of the openable case section being insulated from the base and case and so connected as to form part of the circuit path from the plug attachment posts to the heating element that is arranged in the openable section and is turnable up and down on the hinges.

In the accompanying drawings Fig. 1 shows a back view of the toaster. Fig. 2 shows a closed top view. Fig. 3 shows a side view with the casing closed. Fig. 4 shows a side view of the toaster with the casing open. Fig. 5 is a view looking into the hinged section of the casing. Fig. 6 shows a horizontal section looking downward, the section being taken on the plane indicated by the dotted line 6—6 on Fig. 3.

The article illustrated has a base 1 provided with supporting feet 2. Mounted on the base is a plate 3 which forms the bottom of the oven. This plate is desirably separated from the base by posts 4 so as to leave an insulating air space between the bottom of the oven and the base. The casing comprises two sections 5 and 6. These sections are in the shape of boxes with one side open and they are arranged on the bottom plate with the open sides facing each other. The section 5 is rigidly attached in a vertical position to the bottom plate, while the section 6 is attached to the bottom plate by hinges 7 so that it may be closed against or opened from the fixed vertical section of the casing. Located in each of the case sections is a resistance wire 8 which forms the heating element for the section. The resistance wires are suitably insulated and are passed back and forth in any approved manner to obtain the required length. The ends of the resistance wire in the fixed case section 5 are connected with the attachment plug posts 9 that are fastened to the back of the fixed section, and the ends of the resistance wire in the hinged section 6 are connected with the hinges 7. The hinges are separated from the case section by pieces of insulation 10, preferably mica, and they are separated from the bottom plate by similar pieces of insulation 11. The insulated hinges are connected to insulated wire leads 12 that pass below the bottom plate from the hinges to the attachment plug posts. In the open side of each of the case sections is a grill 13 designed to protect the resistance wires and prevents the material being toasted from contact therewith.

With this structure the material to be toasted is placed on the grill in the opened hinged section of the case and then this section is closed against the fixed vertical section. The resistance wires being on both sides of the material, toast both sides equally and being entirely enclosed by the casing the generated heat is conserved and concentrated on the material being toasted. When the toasting is completed the hinged section is swung open and the piece removed.

The invention claimed is:—

1. An electric toaster comprising a base, a casing formed of two box sections each containing a heating element, said sections having closed outer walls and open on the sides that face each other, one section being fixed in a vertical position to the base and the other section being hinged at its outer lower edge to the base whereby when the sections are closed their contents is enclosed therein, and grills located in the open sides of the case sections for the protection of the heating elements.

2. An electric toaster comprising a base, an enclosed casing section fixed to the base, an enclosed casing section hinged to the base, attachment plug posts, conductors connecting said posts with the hinges of the hinged casing section, said hinges being insulated from the base and casing, a heating element in the fixed casing section with its terminals connected to said posts, and a heating element in the hinged casing section with its terminals connected to the hinges of said section.

3. An electric toaster comprising a base, a casing formed of two box sections each containing a heating element, said sections having closed outer walls, and open on the sides that face each other, one section being hinged to the base by hinges insulated from the base and casing and electrically connected in the heating circuit.

4. An electric toaster comprising a base, a casing section fixed to the base, a heating element located in the fixed casing section, a casing section hinged to the base and adapted to be closed against the fixed casing section and provide an enclosed heating chamber, a heating element located in the hinged casing section, and electric conductors leading to said heating elements.

5. An electric toaster comprising a base, a casing section fixed to the base, a heating element located in the fixed casing section, a casing section hinged to the base, a heating element located in the hinged casing section, and conducting wires connected with the heating element in the fixed casing section and with the hinging means of the hinged casing section.

6. An electric toaster comprising a base, a casing formed of two box sections each containing a heating element, said casing sections being connected to the base so that they may be opened apart for receiving substances to be toasted and closed together so as to provide an enclosed heating chamber containing the heating elements in parallel relation for toasting the substances between them.

7. An electric toaster comprising a base, a casing section fixed to the base, a casing section hinged to the base, the hinges of said latter section being insulated from the base and casing, a heating element in the fixed casing section and conducting wires leading thereto, a heating element in the hinged casing section electrically connected with the hinges of said section, and conducting wires leading to said hinges.

FRANK E. WOLCOTT.